(12) United States Patent
Asami

(10) Patent No.: US 8,764,333 B2
(45) Date of Patent: Jul. 1, 2014

(54) WATER BASED INK COMPOSITIONS FOR BALLPOINT PEN

(75) Inventor: Hideaki Asami, Nagoya (JP)

(73) Assignee: The Pilot Ink Co., Ltd., Nagoya-Shi (JP)

( * ) Notice: Subject to any disclaimer, the term of this patent is extended or adjusted under 35 U.S.C. 154(b) by 772 days.

(21) Appl. No.: 12/448,890

(22) PCT Filed: Jan. 30, 2008

(86) PCT No.: PCT/JP2008/051345
§ 371 (c)(1),
(2), (4) Date: Jul. 14, 2009

(87) PCT Pub. No.: WO2008/096645
PCT Pub. Date: Aug. 14, 2008

(65) Prior Publication Data
US 2010/0040401 A1    Feb. 18, 2010

(30) Foreign Application Priority Data

Feb. 9, 2007 (JP) ................................. 2007-030480
Dec. 14, 2007 (JP) ................................. 2007-322939

(51) Int. Cl.
*B43K 7/00* (2006.01)

(52) U.S. Cl.
USPC .......................... 401/209; 106/31.13; 401/141

(58) Field of Classification Search
USPC ............ 401/196, 209, 142; 106/31.13, 31.36, 106/31.6, 31.7, 31.9
See application file for complete search history.

(56) References Cited

U.S. PATENT DOCUMENTS

| 4,163,675 | A |   | 8/1979 | Hirano et al. |
| 4,671,691 | A |   | 6/1987 | Case et al. |
| 5,013,361 | A |   | 5/1991 | Case et al. |
| 5,279,652 | A | * | 1/1994 | Kaufmann et al. ............ 401/196 |
| 5,599,648 | A | * | 2/1997 | Kondo et al. ................. 430/256 |

(Continued)

FOREIGN PATENT DOCUMENTS

| EP | 1475243 A2 | 11/2004 |
| EP | 1580242 A1 | 9/2005 |

(Continued)

OTHER PUBLICATIONS

International Search Report dated Mar. 11, 2008, issued on PCT/JP2008/051345.

(Continued)

*Primary Examiner* — David Walczak
*Assistant Examiner* — Jennifer C Chiang
(74) *Attorney, Agent, or Firm* — Edwards Wildman Palmer LLP; James E. Armstrong, IV; Nicholas J. DiCeglie, Jr.

(57) ABSTRACT

A water based ink composition for a ballpoint pen containing ι-carrageenan in addition to a dye, water and a water-soluble organic solvent. When used in the ball point pen, the ink composition satisfies an ink drooling prevention and a drying resistance which are mutually incompatible functions and is excellent in writing performance regardless of containing a dye as a coloring agent. The ink composition (c) is used, for example, by accommodating a refill (12) whose ink accommodating tube (18) is filled with the ink composition and which is further loaded with an ink backflow-preventing member (20) in the ballpoint pen (10) whose writing edge is retracted and extruded from a front end opening of a barrel (21).

9 Claims, 1 Drawing Sheet

(56) References Cited

U.S. PATENT DOCUMENTS

| | | | |
|---|---|---|---|
| 6,200,053 B1 * | 3/2001 | Asami et al. | 401/142 |
| 6,599,353 B2 * | 7/2003 | Spencer et al. | 106/31.6 |
| 2003/0041776 A1 | 3/2003 | Spencer et al. | |

FOREIGN PATENT DOCUMENTS

| | | |
|---|---|---|
| JP | 54-12924 | 1/1979 |
| JP | 59-045372 | 3/1984 |
| JP | 2002-226759 | 8/2002 |
| JP | 2003-531267 | 10/2003 |
| JP | 2005-132885 A | 5/2005 |

OTHER PUBLICATIONS

Extended European Search Report, issued in corresponding European Patent Application No. EP 08704127.3, dated Mar. 4, 2014.

* cited by examiner

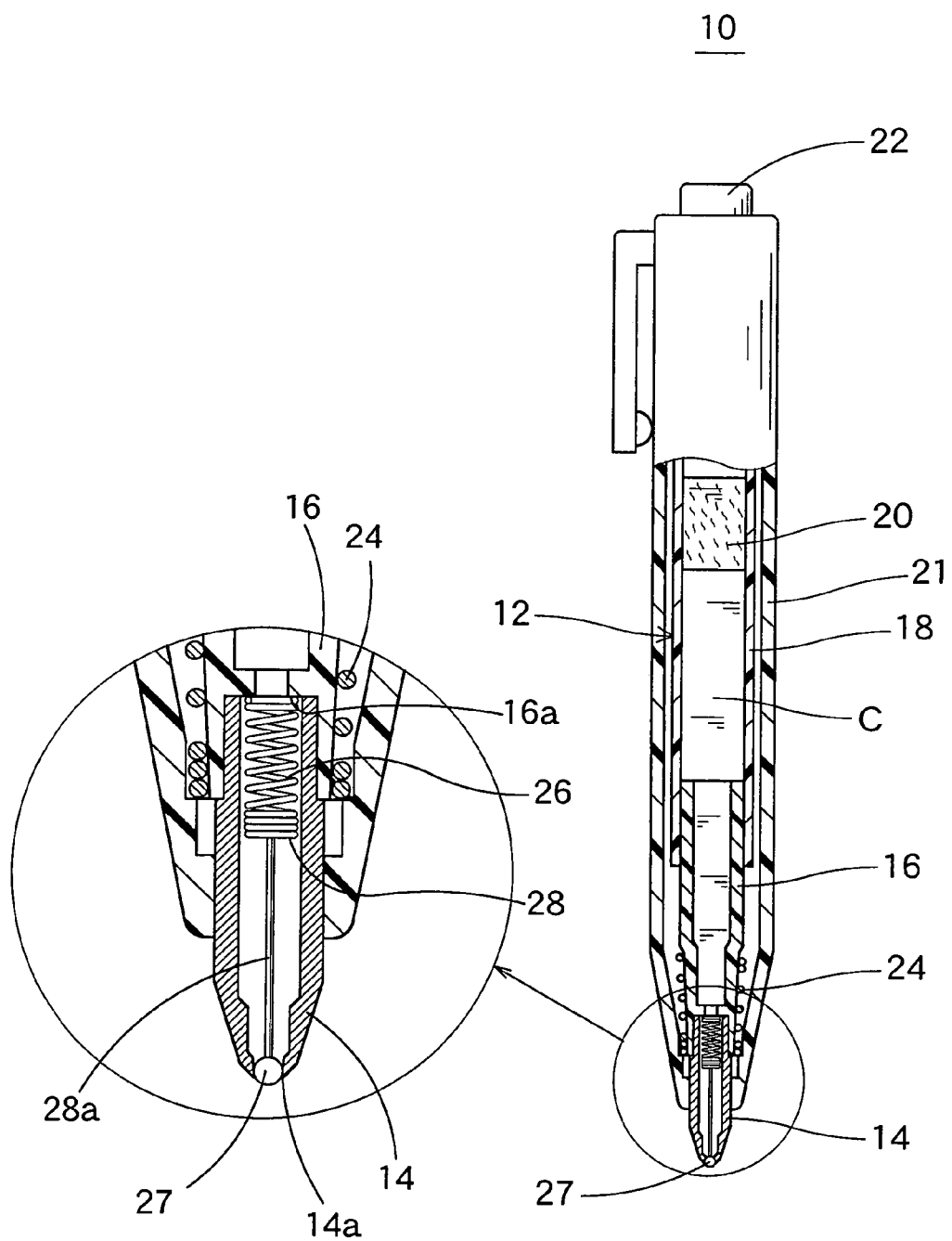

WATER BASED INK COMPOSITIONS FOR BALLPOINT PEN

TECHNICAL FIELD

The present invention relates to a water based ink composition for a ballpoint pen, as well as a refill for the ballpoint pen charged therewith and a retractable ballpoint pen. The water based ink composition for the ballpoint pen of the present invention is excellent in dry up resistance (drying resistance) and drooling prevention performance so as to particularly inhibit occurrence of blur and writing malfunction caused by drying of a pen tip even when the pen tip is exposed to ambient air for a long period of time.

A blending unit such as "%" herein and in claims is a mass unit unless otherwise specified.

An "acid residue" refers to a remaining portion after removing hydrogen (H) or hydroxyl (OH) in a sulfonic acid group or a carboxylic acid group in naphthalenesulfonic acids and naphthalenecarboxylic acids.

BACKGROUND ART

Numerous retractable ballpoint pens which house in a barrel a ballpoint pen refill in which a water based ink for the ballpoint pen is filled in an ink reservoir and a back end of a portion filled with the ink is provided with a backflow-preventing member (ink follower) and which requires no cap have been marketed. In the retractable ballpoint pen, when the housed ink has a relatively high viscosity, ink drooling from the pen tip can be prevented to some extent, but when ink having a low viscosity is used, the ink drooling easily occurs.

The drying resistance of the water based ink for the ballpoint pen is important when the pen tip is exposed. Thus, it has been attempted to increase the amounts of urea and a derivative thereof as an anti-drying agent for the pen tip (e.g., see Patent Document 1).

However, urea and the derivative thereof exhibit the drying resistance by virtue of their high moisture absorption capacity. Thus, when the ink excessively containing these is left to stand under a condition at high humidity, moisture is absorbed locally at the pen tip. Therefore, the viscosity of the ink in a pen tip portion is reduced due to the moisture absorption, and phenomena such as "ink drooling" where the ink is pooled in the pen tip portion and "ink dropping" where the pooled ink is dropped easily occur. In particular, among coloring agents, the ink using a pigment hardly causes the ink drooling and the ink dropping because the pigment is dispersed in a particulate state in the ink, while in the case of using a dye, it is difficult to control the ink drooling and the ink dropping particularly in the ink having a low viscosity.

As described above, although means exist for enhancing the dry up resistance of the ink composition, other writing performance is not sufficiently satisfied, such as the ink drooling and the ink dropping that will likely occur. In particular, when the ink composition is used for the retractable ballpoint pen, it is an important requirement not to produce the ink drooling and the ink dropping simultaneously together with the dry up resistant performance.

Patent Document 1: Japanese Published Patent Application No. Sho-59-45372-A

DISCLOSURE OF INVENTION

Problem to be Solved by the Invention

It is an object (problem) of the present invention to provide a water based ink composition which can satisfy an ink drooling and a drying resistance (dry up resistance) which are mutually incompatible functions even when a dye is contained as coloring agent if the present invention is applied to a ballpoint pen. That is, when the ink composition of the present invention is applied to a ballpoint pen, the start of writing is good not only at an early stage but also even after being used for a long period of time, as well as failures such as blur of handwriting and ink drooling not being produced (a stable writing performance can be kept, and good handwriting can be obtained continuously).

Thus, the ink composition of the present invention is suitable for a retractable ballpoint pen which has a structure in which a ballpoint pen tip is always opened to the atmosphere when the ballpoint pen is not used for writing and requires no cap.

Means for Solving Problem

The water based ink composition for the ballpoint pen of the present invention contains ι-carrageenan as an essential component of a viscous property controlling agent in addition to a dye, water and a water-soluble organic solvent.

It is preferable that the ink composition exhibits a shear thinning index (n; 20° C.) of approximately 0.4 to 0.9 obtained using an experimental formula ($T=Kj^n$) in a viscosity [cone and plate rotary viscometer (EL type: 20° C.)] of 1 or more and less than 20 mPa·s.

It is preferable that the ink composition contains a naphthalene-based dye intermediate.

It is preferable that the naphthalene-based dye intermediate is obtained by selecting one or two or more from those including an acid residue of naphthalenesulfonic acids (1) (including N-substituted products) represented by the following structural formula (A) and those including an acid residue of naphthalenecarboxylic acids (2) (including N-substituted products) represented by the following structural formula (B).

(1)

[Chemical formula 1]

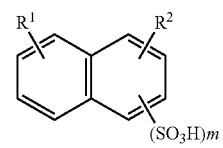

$(SO_3H)m$ (In the formula, m denotes an integer of 1 to 3, and $R^1$ and $R^2$ respectively denote H, OH or $NH_2$.)

(2)

[Chemical formula 2]

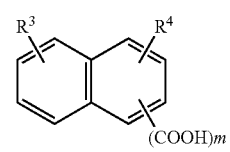

$(COOH)m$ (In the formula, m denotes an integer of 1 to 4, and $R^3$ and $R^4$ respectively denote H, OH or $NH_2$.)

In this regard, however, R' in the N-substituted product (NHR') denotes an alkyl (1 to 9 carbon atoms), alkylacyl (1 to 9 carbon atoms), benzoyl or benzensulfonyl.

And, it is preferable that the naphthalene-based dye intermediate is selected from those including the acid residue of the above structural formula (1). Here, aminonaphtholsulfonic acids are more preferable as naphthalenesulfonic acids.

It is preferable that the aminonaphtholsulfonic acids are selected from those including the acid residue of N-acyl J acid (2 to 4 acyl carbon atoms) represented by the following structural formula (3).

(3)

[Chemical 3]

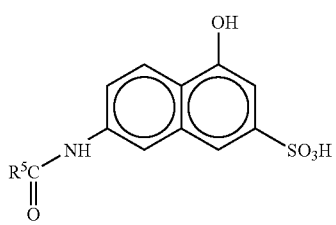

Desirable aspects of the present invention include a refill for the ballpoint pen filled with the water based ink composition for the ballpoint pen and a refill in which a writing edge of the refill for the ballpoint pen is assembled so as to be retractable from a front end opening of a ballpoint pen barrel.

BRIEF DESCRIPTION OF DRAWING

FIG. 1 is a vertical cross-sectional view showing one example of a retractable ballpoint pen to which an ink composition of the present invention has been applied.

BEST MODES FOR CARRYING OUT THE INVENTION

Aspects (specific constitutions) of the preferable ink composition for the ballpoint pen of the present invention will be described below.

1) The water based ink composition contains ι-carrageenan as an essential component of a viscous property controlling agent in addition to a dye, water and a water-soluble organic solvent.

ι-Carrageenan is stably present in the ink, as well as being excellent in performance in preventing the ink drooling.

Carrageenan is typically classified by differences between an anhydro group and a sulfate group in its molecule into three types, i.e., Kappa (κ-) type which is strong in gelling property and protein reactivity, Iota (ι-) type which is rich in thickening property and Lambda (λ-) type which is soluble in cold water and is not gelled.

The ι-carrageenan does not prevent the drying resistance like urea, and exhibits the higher ink drooling prevention particularly in dye-based inks than λ-carrageenan. κ-Carrageenan is dissolved in ink, is not thickened and is gelled. Thus, this is difficult to be blended in ink for the ballpoint pen.

A content of the ι-carrageenan is preferably approximately 0.05 to 1.0%, more preferably approximately 0.1 to 0.6% and still more preferably approximately 0.1 to 0.3% in a total amount of the ink composition. When the content of the ι-carrageenan is low, an ink drooling prevention effect is not obtained. Conversely when it is high, ink viscosity is increased, which causes blobbing and dotting and easily prevents an ink following property. Further the drying resistance is likely adversely affected.

In particular, by combining the naphthalene-based dye intermediate with the ι-carrageenan, the ink drooling is effectively prevented even when an ink passing space is formed between a ball 26 and an edge portion (ball holding part) 14a of a ballpoint pen tip 14 over time due to damage of a tip edge and jamming from scrap paper when the ballpoint pen is not used for writing (see FIG. 1).

The content of the naphthalene-based dye intermediate is preferably approximately 0.1 to 5%, more preferably approximately 0.5 to 4% and still more preferably approximately 0.5 to 2% in the total amount of the ink composition.

When the content of the naphthalene-based dye intermediate is low, the ink drooling prevention effect is difficult to be obtained. Conversely, when it approaches 5%, it cannot be anticipated to further enhance the ink drooling prevention effect, and further the other properties are likely to be adversely affected (decrease of cap off property and ink stability). Here, the cap off property refers to the performance to inhibit the occurrence of writing blur and writing failure when the ballpoint pen is used for writing after the cap of the ballpoint pen is removed and the pen tip is exposed to air for a long period of time. The ink stability refers to the performance to prevent precipitates from being produced with time to cause a reduction in the various performances and ink clogging.

The naphthalene-based dye intermediate can include those including the acid residue of naphthalenesulfonic acids (1) (including N-substituted products) represented by the following structural formula (A) and those including the acid residue of naphthalenecarboxylic acids (2) (including N-substituted products) represented by the following structural formula (B).

(1)

[Chemical 4]

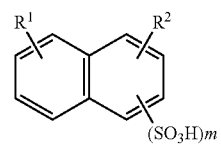

(In the formula, m denotes an integer of 1 to 3, and $R^1$ and $R^2$ respectively denote H, OH or $NH_2$.)

(2)

[Chemical 5]

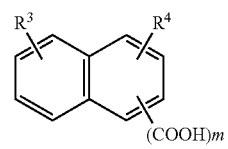

(In the formula, m denotes an integer of 1 to 4, and $R^3$ and $R^4$ denote H, OH or $NH_2$.)

In the above, R' in the N-substituted product (NHR') denotes an alkyl (1 to 9 carbon atoms), alkylacyl (1 to 9 carbon atoms), benzoyl or benzensulfonyl.

More specifically, the naphthalene-based dye intermediate is as follows. The number in each pair of parentheses denotes a substituted position in a sulfonate group ($SO_3H$) and a carboxyl group (COOH).

As those including the above acid residue (ink raw material), those having a form of an alkali metal salt is usually used in terms of water-solubility, but those having a form of other metal salts, ammonium salts and acid amide can also be used.

When the solubility of these ink raw materials is insufficient, they can be used by combining the water-soluble organic solvent.

<Naphthalenesulfonic Acid-Based>
1) Naphthalenesulfonic Acids
Monosulfonic acid (1 or 2), disulfonic acid (1, 5; 2, 6 or 2, 7) and trisulfonic acid (1, 3, 6)
2) Naphtholsulfonic Acids
1-naphtholmonosulfonic acid (2, 3, 4, 5, 6, 7 or 8), 2-naphtholmonosulfonic acid (1, 3, 4, 5, 6, 7 or 8), 1-naphtholdisulfonic acid (2, 4; 2, 5; 2, 7; 3, 6; 3, 7; 3, 8 (ε acid); 4, 7; 4, 8 or 6, 8), 2-naphtholdisulfonic acid (1, 4; 1, 5; 1, 6; 1, 7; 3, 6-3, 7; 4, 8 or 6, 8), 1-naphtholtrisulfonic acid (2, 4, 7; 2, 4, 8 or 3, 6, 8)
3) Naphthylaminesulfonic Acids
1-Naphthylaminemonosulfonic acid (2, 3, 4, 5, 6, 7 or 8 [peri acid]),
2-naphthylaminemonosulfonic acid (1, 4, 5, 6, 7 or 8),
1-naphthylaminedisulfonic acid (2, 4; 2, 5; 2, 7; 2, 8; 3, 5; 3, 6; 3, 7; 3, 8; 4, 6; 4, 7; 5, 7 or 5, 8 substituted products),
2-naphthylaminedisulfonic acid (1, 6; 1, 7; 3, 6; 3, 7; 4, 7; 4, 8; 5, 7 or 6, 8),
1-naphthylaminetrisulfonic acid (2, 4, 6; 2, 4, 7; 2, 5, 7; 3, 6, 8 or 4, 6, 8),
2-naphthylamine-3,6,8-trisulfonic acid
4) Dihydroxynaphthalenesulfonic Acids
1,6-dihydroxynaphthalene-3-sulfonic acid,
1,7-dihydroxynaphthalene-3-sulfonic acid,
1,8-dihydroxynaphthalene-4-sulfonic acid,
1,3-dihydroxynaphthalene-5,7-disulfonic acid,
1,2-dihydroxynaphthalene-3,6-disulfonic acid,
1,5-dihydroxynaphthalene-2,4-disulfonic acid,
1,8-dihydroxynaphthalene-3,5-disulfonic acid,
1,8-dihydroxynaphthalene-3,6-disulfonic acid (chromotropic acid),
2,7-dihydroxynaphthalene-3,6-disulfonic acid
5) Aminonaphtholsulfonic Acids
1-amino-2-naphthol-4-sulfonic acid,
1-amino-2-naphthol-6-sulfonic acid,
1-amino-7-naphthol-3-sulfonic acid,
1-amino-8-naphthol-4-sulfonic acid (S acid),
2-amino-3-naphthol-6-sulfonic acid,
2-amino-5-naphthol-7-sulfonic acid (J acid),
2-amino-8-naphthol-6-sulfonic acid (γ acid),
5-amino-1-naphthol-2-sulfonic acid,
8-amino-1-naphthol-4-sulfonic acid,
1-amino-2-naphthol-3,6-disulfonic acid (H acid),
1-amino-8-naphthol-2,4-disulfonic acid (K acid),
1-amino-8-naphthol-3,5-disulfonic acid,
1-amino-8-naphthol-3,6-disulfonic acid,
1-amino-8-naphthol-4,6-disulfonic acid,
1-amino-8-naphthol-5,7-disulfonic acid,
2-amino-1-naphthol-4,8-disulfonic acid,
2-amino-8-naphthol-3,6-disulfonic acid,
6) Naphthyenediaminesulfonic Acids
1,2-Naphthyenediaminemonosulfonic acid (3, 4, 5, 6 or 7),
1,3-naphthyenediaminemonosulfonic acid (5 or 6),
1,4-naphthyenediaminemonosulfonic acid (2, 5 or 6),
1,5-naphthyenediaminemonosulfonic acid (2 or 4),
1,6-naphthyenediamine-4-sulfonic acid,
1,8-naphthyenediamine-4-sulfonic acid,
1,8-naphthyenediaminedisulfonic acid (3, 6 or 4, 5)
7) Derivatives of Sulfonic Acids
Peri acid derivatives: N-p-tolylperi acid, phenylperi acid, phenylperi acid indophenol
2-(2,4-Diaminophenoxy)naphthalene-6-sulfonic acid
Ethoxychromotropic acid
Ethoxycleves acid
o-Benzenesulfonyl H acid
6-Cleves acid indophenol
7-Cleves acid indophenol
Diphenyl ε acid
1-Diazo-6-nitro-2-naphthol-4-sulfonic acid
4-Nitroso-3-naphthol-2,7-disulfonic acid
J acid N-substituted derivatives: N-phenyl J acid, N-methyl J acid, N-acetyl J acid, N-benzoyl J acid, N-carbamic J acid
J acid benzoyl substituted derivatives: p-nitrobenzoyl J acid, m-nitrobenzoyl J acid, p-aminobenzoyl J acid, m-aminobenzoyl J acid
N-Substituted derivatives of γ acid, S acid, H acid and K acid: N-phenyl γ acid, N-dimethyl γ acid, N-p-carboxyphenyl γ acid, N-benzoyl S acid, N-acetyl H acid, N-benzoyl H acid, N-benzensulfonyl H acid and N-benzoyl K acid
<Naphthalenecarboxylic Acid-Based>
1) Naphthalenemonocarboxylic acids (1 [1-naphthoic acid] or 2 [2-naphthoic acid])
2) Naphthalenedicarboxylic acids (1, 2; 1, 3; 1, 4; 1, 5; 1, 6; 1, 7; 1, 8; 2, 3; 2, 6; 2, 7)
3) Naphthalene-1,4,5,8-tetracarboxylic acid
4) Naphthoic acid derivatives
Hydroxy-1-naphthoic acids (OH-substituted positions: 2, 3, 4, 5, 6, 7 or 8)
2-Hydroxy-1-naphthoic acid
Hydroxy-2-naphthoic acids (OH-substituted positions: 1, 3, 4, 5, 6, 7 or 8).

It is preferable that the naphthalene-based dye intermediate is selected from the group of the naphthalenesulfonic acids represented by the above structural formula (1), in particular, aminonaphtholsulfonic acids and N-substituted derivatives thereof. More preferably, the naphthalene-based dye intermediate is selected from those including the acid residue of N-acyl J acid represented by the following structural formula (3) in terms of ink stability and ink drooling prevention.

(3)

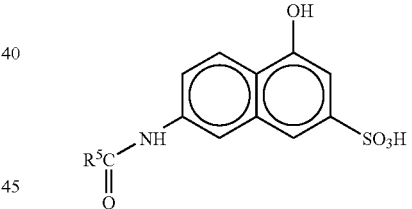

[Chemical 6]

As the dye, any of those which can be dissolved or dispersed in an aqueous medium can be used, and specific examples thereof are exemplified below.

As acid dyes, new coccine (C.I. 16255), tartrazine (C.I. 19140), acid blue black 10B (C.I. 20470), Guinea green (C.I. 42085), brilliant blue FCF (C.I. 42090), acid violet 6BN (C.I. 43525), soluble blue (C.I. 42755), naphthalene green (C.I. 44025), eosin (C.I. 45380), phloxine (C.I. 45410), erythrocin (C.I. 45430), nigrosine (C.I. 50420) and acid flavin (C.I. 56205) and the like are used.

As basic dyes, chrysoidine (C.I. 11270), methyl violet FN (C.I. 42535), crystal violet (C.I. 42555), malachite green (C.I. 42000), Victoria blue FB (C.I. 44045), rhodamine B (C.I. 45170), acridine orange NS(C.I. 46005) and methylene blue B (C.I. 52015) and the like are used.

As direct dyes, congo red (C.I. 22120), direct sky blue 5B (C.I. 24400), violet BB (C.I. 27905), direct deep black EX (C.I. 30235), Kayarus black G conc (C.I. 35225), direct fast black G (C.I. 35255) and phthalocyan blue (C.I. 74180) and the like are used.

When the dye is used as a coloring agent, the dry up resistant performance becomes the important requirement in the system of applying to a retractable ballpoint pen which requires no cap because the dry up is remarkable.

One or two or more of the dyes can be mixed appropriately and used. The content of the dye is preferably approximately 1 to 25% and more preferably approximately 2 to 15% in the total amount of the ink composition.

Furthermore, various pigments can also be blended by combining with the dye.

As the pigments, inorganic pigments such as carbon black and ultramarine blue pigment, organic pigments such as copper phthalocyan blue and benzidine yellow, and water-dispersed pigments previously dispersed in the aqueous medium finely and stably using a surfactant and a resin are used, and can include, for example, C.I. pigment blue 15:3 B (product name: Sandye Super Blue GLL, pigment content: 24%, supplied from Sanyo Color Works Ltd.), C.I. pigment red 146 (product name Sandye Super Pink FBL, pigment content: 21.5%, supplied from Sanyo Color Works Ltd.), C.I. pigment yellow 81 (product name: TC Yellow FG, pigment content: approximately 30%, supplied from Dainichiseika Color & Chemicals Mfg. Co., Ltd.) and C.I. pigment red 220/166 (product name: TC Red FG, pigment content: approximately 35%, supplied from Dainichiseika Color & Chemicals Mfg. Co., Ltd.).

Water-dispersed pigments using water-soluble resins include

C. I. pigment Black 7 (brand name: WA Color Black A25, pigment content: 15%, supplied from Dainichiseika Color & Chemicals Mfg. Co., Ltd.), C. I. pigment Green 7 (brand name: WA-S Color Green, pigment content: 8%, supplied from Dainichiseika Color & Chemicals Mfg. Co., Ltd.), C.I. pigment violet 23 (brand name: Micropigmo WMVT-5, pigment content: 20%, supplied from Orient Chemical Industries Ltd.) and C.I. pigment yellow 83 (brand name: Emacol NS Yellow, pigment content: 30%, supplied from Sanyo Color Works Ltd.).

Further, as fluorescent pigments, synthetic resin fine particulate fluorescent pigments obtained by making a solid solution of a fluorescent dye in a resin matrix can be used. In addition, it is possible to exemplify metallic luster pigments, light storing pigments, white pigments such as a titanium dioxide, silica and calcium carbonate, capsule pigments encapsulating a reversible thermal color change composition, perfume materials and capsule pigments encapsulating the perfume material.

As the metallic luster pigments, it is possible to exemplify metallic powders of aluminium and brass, pearl pigments obtained by coating the surface of natural mica, synthetic mica, glass pieces, alumina or transparent film pieces as a core material with a metal oxide such as a titanium oxide, those obtained by finely cutting a metallic luster film piece where one side or both sides of a metal deposition film have been provided with a transparent or a colored transparent film, and those obtained by finely cutting an iridic film laminating multiple transparent resin layers.

When the metallic powder of aluminium and brass is used, those obtained by coating the surface of the metallic powder with the transparent resin or the colored transparent resin are suitably used, and are excellent in stability in the ink composition.

When the pigment is combined, a pigment dispersant can be added if necessary.

As the pigment dispersant, anionic and nonionic surfactants, anionic polymers such as a polyacrylic acid and a styrene acrylic acid, and nonionic polymers such as a polyvinyl pyrrolidone and a polyvinyl alcohol are used.

Examples of the water-soluble organic solvent (polar solvent) include ethanol, propanol, butanol, glycerine, sorbitol, triethanolamine, diethanolamine, monoethanolamine, ethylene glycol, diethylene glycol, thiodiethylene glycol, hexylene glycol, 1,3-butandiol, neoprene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, ethylene glycol monomethyl ether acetate, sulfolane, 2-pyrrolidone and N-methyl-2-pyrrolidone.

One or two or more of the water-soluble organic solvents can also be combined.

Further, in addition to the above components, one or two or more water-soluble polymers such as alkyd resins, acryl resins, styrene maleic acid copolymers, cellulose derivatives, polyvinyl pyrrolidone, polyvinyl alcohol, λ-carrageenan, methyl cellulose, carboxymethylcellulose and alkali metal salts of carboxymethylcellulose can be added as the viscous property controlling agent.

In addition, pH adjusters, antirust agents, preservatives or fungicides, lubricants, wetting agents can be added if necessary.

The pH adjuster includes inorganic salts such as sodium carbonate, sodium phosphate, sodium hydroxide and acetate soda, and organic basic compounds such as water-soluble amine compounds such as triethanolamine and diethanolamine.

The antirust agent includes benzotriazole and derivatives thereof, tolyltriazole, dicyclohexylammonium nitrite, diisopropylammonium nitrite, sodium thiosulfate, ethylenediamine tetraacetic acid, saponin and dialkylthiourea.

The preservative or the fungicide includes carbolic acid, sodium salts of 1,2-benzisothiazoline-3-one, sodium benzoate, sodium dehydroacetate, potassium sorbate, propyl paraoxybenzoate and 2,3,5,6-tetrachloro-4-(methylsulfonyl) pyridine.

The lubricant includes higher fatty acids such as oleic acid, nonionic surfactants having a long chain alkyl group, polyether modified silicone oils, thiophosphite triester such as thiophosphite tri(alkoxycarbonylmethyl ester) and thiophosphite tri(alkoxycarbonylethyl ester), phosphate monoester of polyoxyethylene alkyl ether or polyoxyethylene aryl ether, phosphate diester of polyoxyethylene alkyl ether or polyoxyethylene aryl ether, or metal salts, ammonium salts, amine salts and alkanolamine salts thereof.

The wetting agent includes urea, nonionic surfactants, sorbit, mannit, sucrose, glucose, hydrolyzed products of reduced starch and sodium pyrophosphate.

In addition, fluorine-based surfactants which enhance permeability of the solvent, nonionic, anionic and cationic surfactants, and antifoaming agents such as dimethyl polysiloxane can also be added.

When using the ink composition for the ballpoint pen in which the ink composition is housed in the ink reservoir and a back end side of the ink composition is provided with the backflow-preventing member, if the gas is contaminated in the ink, the gas gathers over time to produce bubbles, which adversely affect an ink flow upon writing, as well as if the bubbles are present in the writing edge, writing likely becomes impossible. Thus, it is preferable to chemically remove the bubbles by adding ascorbic acid, ascorbic acid derivatives, erythorbic acid, erythorbic acid derivatives, α-tocopherol, catechin, catechin derivatives, synthesized polyphenol, kojic acid, alkylhydroxylamine, oxime derivatives, α-glucosylrutin, phosphonate salts, sulfite salts, sulfoxylate salts, dithionite salts, thiosulfate salts, thiourea dioxide, formamidinesulfinic acid or glutathione.

A shear thinning imparting agent may be added as desired in the water based ink composition of the present invention. Examples thereof include water-soluble or water-dispersible xanthan gum, Welan gum, succinoglycan which is a heteropolysaccharide modified with an organic acid and composed of glucose and galactose as monosaccharides (average molecular weight approximately 1 to 8 millions), guar gum, locust be an gum and derivatives thereof, hydroxyethylcellulose, alginate alkyl esters, polymers mainly composed of alkyl ester of methacrylic acid and having a molecular weight of 100,000 to 150,000, glucomannan, thickener polysaccharides such as agar and carageenin extracted from seaweeds and having a gelling ability, benzylidene sorbitol and benzylidene xylitol and derivatives thereof, crosslinking acrylic acid polymers, inorganic fine particles, polyglycerine fatty acid ester, polyoxyethylene sorbitan fatty acid ester, polyethylene glycol fatty acid ester, polyoxyethylene alkyl ether-polyoxypropylene alkyl ether, polyoxyethylene alkylphenyl ether, nonionic surfactants such as fatty acid amide having an HLB value of 8 to 12 and salts of dialkyl- or dialkenyl-sulfosuccinic acid. These can be used alone or in mixture.

Further, a mixture of N-alkyl-2-pyrrolidone and the anionic surfactant, and a mixture of polyvinyl alcohol and an acrylic resin can also be used.

A shear thinning property of the ink refers to a rheology property where the ink hardly flows at high viscosity in a state of rest or when a stress is low, while when the stress is increased, the viscosity is reduced to exhibit a good fluidity, and means a liquid property also referred to as a thixotropic property or pseudo-plasticity.

As the viscous property of the ink of the present invention, it is preferable that the shear thinning index (n) is approximately 0.4 to 0.9, which is obtained from the following experimental formula when the measured viscosity is approximately 1 or more and less than 20 mPa·s using the viscometer [cone and plate rotary viscometer (EL type: 20° C.)].

Experimental formula $T=Kj^n$

[T: shear stress (dyne/cm$^2$), K: constant, j: shear rate (76.80 s$^{-1}$), n: shear thinning index] Further, it is preferable that the shear thinning index (n) is approximately 0.4 to 0.7 at a viscosity of approximately 5 or more and less than 20 mPa·s.

A reason why the upper limit of the viscosity is less than 20 mPa·s is because the ink composition of the present invention is not in the category of gel inks (viscosity of 20 mPa·s or more; JIS 6061 (2005)). When the viscosity becomes close to 20 mPa·s, the ink following property by writing is hardly satisfied, and particularly handwriting blur easily occurs upon writing at high speed. A viscosity of less than 20 mPa·s means the ink having low viscosity where the ink drooling easily occurs, and thus the effect of the present invention becomes remarkable.

When the shear thinning index is low, the ink is inferior in feeling of writing, as well as hardly being transferred to the ballpoint at the start of writing. Furthermore, handwriting hardly dries, and the ink is transferred to a blank portion on a surface to be written by finger contact or paper copies to easily stain.

By satisfying the aforementioned viscosity and shear thinning index, it is possible to satisfy the ink drooling prevention, the drying resistance, and satisfy the writing performance, i.e., the feeling of writing, the start of writing, dryness of handwriting and the formation of good handwriting.

Subsequently, the constitution of the ballpoint pen using the water based ink composition of the present invention will be described.

It is suitable that the water based ink composition of the present invention is applied to the retractable ballpoint pen (see FIG. 1). Because the writing edge (ballpoint pen tip) is always exposed to ambient air, the effects of the present invention become remarkable.

The constitution of the retractable ballpoint pen is not limited to a knock type as shown in FIG. 1, and may be a rotary type or a slide type, and further may be a composite type ballpoint pen accommodating multiple refills in the barrel.

The water based ink composition of the present invention can be applied to not only the aforementioned retractable ballpoint pens but also cap ballpoint pens, and further various types of ballpoint pens such as disposable ballpoint pens whose barrel is directly filled with an ink composition and not through refill.

Examples

Examples carried out together with Comparative Examples for confirming the effects of the present invention will be described below, but the present invention is not limited to these Examples.

<Preparation of Ink Composition>

A water based ink composition in each Example or Comparative Example was composed and formulated as shown in Tables 1 and 2. The water based ink composition was prepared by stirring a weighed mixture at room temperature at 3,000 rpm for one hour using a dispersion mixer and then filtrating the mixture.

The viscosity of the ink in each Example or Comparative Example was obtained by reading a scale value θ of a viscometer under a condition at 20° C. at 20 rpm (10 rpm only in Comparative Example 2) using a cone and plate rotary viscometer (EL type supplied from Tokyo Keiki Inc.) and multiplying the scale value θ by 0.30 as a conversion multiplier (see an instruction manual).

The shear thinning index (n) was obtained using a common method by reading a scale value θ of the viscometer at multiple rotation speeds (e.g., 20 rpm, 10 rpm, 5 rpm) using the same cone and plate rotary viscometer (20° C.) and assigning the scale value θ in the following experimental formula.

Experimental formula $T=Kj^n$

[In this regard, however, T: shear stress (dyne/cm$^2$), K: constant, j: shear rate (s$^{-1}$), n: shear thinning index]

For example, in Example 1, the shear thinning index was calculated from the experimental formula $T=Kj^n$ and the following viscosity measurement formula using an ink viscosity at 20 rpm: 9 mPa·s, an ink viscosity at 10 rpm: 12.3 mPa·s, and an ink viscosity at 5 rpm: 16.8 mPa·s.

$$T=3M/2\pi R^3$$

$$M=t\times\theta/100$$

[T: shear stress (dyne/cm$^2$), M: viscosity resistant torque (dyne·cm), R: rotor radius (2.4 cm), t: full scale torque (674 dyne·cm), θ: scale read value]

TABLE 1

|  | Note | Example 1 | 2 | 3 | 4 | 5 | 6 | 7 |
|---|---|---|---|---|---|---|---|---|
| Black dye | (1) | 6.0 |  |  | 6.0 | 6.0 |  |  |
| Pink dye | (2) |  | 3.0 |  |  |  | 3.0 |  |
| Red dye | (3) |  | 3.0 |  |  |  | 3.0 |  |
| Blue dye | (4) |  |  | 7.0 |  |  |  | 7.0 |
| ι-Carrageenan | (5) | 0.15 | 0.2 | 0.2 | 0.25 | 0.15 | 0.2 | 0.2 |
| N-Acetyl J acid | (6) |  |  |  |  | 0.85 | 0.6 |  |
| Sodium N-acetyl J acid |  |  |  |  |  |  |  | 1.5 |
| Lubricant | (7) | 0.5 | 1.0 | 1.0 | 1.0 | 0.5 | 1.0 | 1.0 |
| Preservative | (8) | 0.5 |  | 0.5 | 0.5 | 0.5 |  | 0.5 |
| Triethanolamine |  | 1.0 | 1.0 | 1.0 | 1.0 | 1.0 | 1.0 | 1.0 |
| Diethylene glycol |  | 10.0 | 5.0 | 5.0 | 5.0 | 10.0 | 5.0 | 5.0 |
| Water |  | 81.85 | 86.8 | 85.3 | 86.25 | 81.0 | 86.2 | 83.8 |
| Ink viscosity (mP · s) |  | 9 | 12 | 13 | 15 | 10 | 14 | 15 |
| Shear thinning index (n) |  | 0.55 | 0.60 | 0.42 | 0.41 | 0.50 | 0.58 | 0.42 |

TABLE 2

|  | Note | Example 1 | 2 | 3 | 4 | 5 | 6 |
|---|---|---|---|---|---|---|---|
| Black dye | (1) | 6.0 |  |  | 6.0 | 6.0 |  |
| Pink dye | (2) |  | 3.0 |  |  |  | 3.0 |
| Red dye | (3) |  | 3.0 |  |  |  | 3.0 |
| Blue dye | (4) |  |  | 7.0 |  |  |  |
| Xanthan gum | (9) | 0.15 | 0.5 |  |  | 0.15 |  |
| λ-Carrageenan | (10) |  |  | 0.2 | 0.25 |  | 0.2 |
| N-acetyl J acid | (6) |  |  |  |  | 0.85 | 0.6 |
| Lubricant | (7) | 0.5 | 1.0 | 1.0 | 1.0 | 0.5 | 1.0 |
| Preservative | (8) | 0.5 |  | 0.5 | 0.5 | 0.5 |  |
| Triethanolamine |  | 1.0 | 1.0 | 1.0 | 1.0 | 1.0 | 1.0 |
| Diethylene glycol |  | 10.0 | 5.0 | 5.0 | 5.0 | 10.0 | 5.0 |
| Water |  | 81.85 | 86.5 | 85.3 | 86.25 | 81.0 | 86.1 |
| Ink viscosity (mPa · s) |  | 20 | 50 | 10 | 12 | 20 | 10 |
| Shear thinning index (n) |  | 0.35 | 0.30 | 0.95 | 0.94 | 0.35 | 0.95 |

Details of raw materials in the Tables areas follows. Each number corresponds to the number in the Tables.

(1) C.I. 50420, brand name: Water Black R510 supplied from Orient Chemical Industries Ltd., (2) C.I. 45410, brand name: Phloxine supplied from Aizen Hodogaya Co., Ltd., (3) C.I. 45380, brand name: Eosin supplied from Daiwa Kasei Co., Ltd., (4) C.I. 42655, brand name: Acid Blue PG supplied from Sumitomo Chemical Co., Ltd., (5) Brand name: Newgelin GJ500 supplied from Chuo Food material Co., Ltd., (6) Brand name: N-Acetyl J acid supplied from Sugai Chemical Industry Co., Ltd., (7) Brand name: Prisurf AL, mixture of polyoxyethylene distyrenated phenyl ether phosphate monoester and diester, supplied from Dai-ichi Kogyo Seiyaku Co., Ltd., (8) Brand name: Proxel XL-2,1,2-benzthiazoline-3-one, supplied from Avecia Co., Ltd., (9) Brand name: Echo gum supplied from Dainichi Pharmaceutical Co., Ltd., and

(10) Brandname: Carageenin CSL-2 supplied from San-Ei-Gen FFI Inc.

<Production of Ballpoint Pens (Samples)>

The ballpoint pen was made using each ink composition prepared above.

The structure of the applied ballpoint pen 10 is shown in FIG. 1.

A refill 12 is one where an ink accommodating tube 18 to which a ballpoint pen tip 14 is bonded via a connecting tube 16 is filled with the ink composition C. After filling the ink composition C, a backflow-preventing member (ink follower) 20 composed of a fluid with high viscosity is arranged at a position of a filled height. The refill 12 is housed in a barrel 21, and a back end of the barrel 21 is provided with a knocking member 22. The writing edge of the refill 12 is retracted and extruded from a front opening of the barrel 21 by use of a coil spring 24 for retracting and extruding by a pressing force of the knocking member 22.

A ball 27 is held in an edge portion 14a which is the writing edge of the ballpoint pen tip 14 by being biased with a pressing spring 26. The pressing spring 26 is held with a disc tip spring seat 28 comprising a pressing rod 28a which presses the ball 27 at the edge and a base spring seat 16a formed at a bottom of a tip holding hole of the connecting tube 16. In this way, in an ordinary state, the edge portion 14a is closed with the ball 27 biased by the spring, and upon writing, the ball 27 is retracted with a writing pressure and an ink passing space is formed by the edge portion 14a and the ball 32 to allow writing. The ink backflow-preventing member 20 in which polybutene is used as a base oil and fatty acid amide is used as a thickener is used.

The following tests were carried out using each ballpoint pen (sample) made in this way.

<Ink Drooling Test A>

Using each ballpoint pen, the ballpoint pen tip was exposed from the barrel, the tip was kept downward, left to stand under an atmosphere with a temperature at 20° C. and relative humidity at 55% for 20 hours, and then an appearance of the edge of the tip was visually observed and evaluated by the following criteria.

◯: No leakage (drooling) of the ink was observed.

Δ: A small droplet of the ink was observed at the edge of the tip.

X: A large droplet was observed at the edge of the tip, or the leaked ink from the edge of the tip was dropped.

<Ink Drooling Test B>

The ball of each ballpoint pen whose writing portion held upward was pressed down by 3-5 μm, and an internal wall of the edge portion is pressed to cause damage. This ballpoint pen was left to stand under an atmosphere with a temperature at 20° C. and relative humidity at 55% for 20 hours, and then the appearance of the edge of the tip was visually observed and evaluated by the same criteria as in the above ink drooling test A.

<Drying Resistance Test>

Using each ballpoint pen, the ballpoint pen tip was exposed from the barrel, held in a horizontal state, and left to stand at 20° C. or 50° C. for 60 days respectively. Subsequently, twelve circles (diameter: approximately 16 mm) were continuously written by hand in one line on JIS P3201 writing paper, was visually observed as to what number of circles could be written normally, and this was evaluated by the following criteria.

○: The first circle could be written normally.

Δ: The second circle or later and within the first line could be written normally.

X: Even when trying to write circles in one line, no circle could be written normally.

<Test Results and Discussion>

From Tables 3 and 4 showing the above test results, it has been found that the ink composition of the present invention exhibits excellent properties.

That is, by adding ι-carrageenan, the ink for the ballpoint pen which could prevent the ink drooling even when the ballpoint pen having practicability was left to stand in a state where the pen tip was exposed for a long period of time was obtained. Also by adding the naphthalene-based dye intermediate together with ι-carrageenan, the ink for the ballpoint pen (Examples 5 to 7) having higher practicability which could prevent the ink drooling even under harsher circumstances where an ink discharge section was enlarged due to damage of the tip edge was obtained.

TABLE 3

|  |  | Example | | | | | | |
| --- | --- | --- | --- | --- | --- | --- | --- | --- |
|  |  | 1 | 2 | 3 | 4 | 5 | 6 | 7 |
| Ink drooling test A | | ○ | ○ | ○ | ○ | ○ | ○ | ○ |
| Ink drooling test B | | Δ | Δ | Δ | Δ | ○ | ○ | ○ |
| Drying resistance | 20° C. | ○ | ○ | ○ | ○ | ○ | ○ | ○ |
| test for 60 days | 50° C. | ○ | ○ | ○ | ○ | ○ | ○ | ○ |

TABLE 4

|  |  | Comparative example | | | | | | |
| --- | --- | --- | --- | --- | --- | --- | --- | --- |
|  |  | 1 | 2 | 3 | 4 | 5 | 6 | 7 |
| Ink drooling test A | | X | Δ | X | X | X | X | Δ |
| Ink drooling test B | | X | Δ | X | X | X | X | X |
| Drying resistance | 20° C. | Δ | Δ | ○ | ○ | ○ | Δ | ○ |
| test for 60 days | 50° C. | Δ | X | ○ | ○ | ○ | Δ | ○ |

The invention claimed is:

1. A water based ink composition for a ballpoint pen containing ι-carrageenan as an essential component of a viscous property controlling agent, in addition to a dye, a naphthalene-based dye intermediate, water and a water-soluble organic solvent, wherein a shear thinning index (n; 20° C.) of the ink composition obtained from the following experimental formula:

Experimental formula $T=Kj^n$

[T: shear stress (dyne/cm$^2$), K: constant, j: shear rate (s$^{-1}$), n: shear thinning index] is approximately 0.4 to 0.9 at a viscosity [cone and plate rotary viscometer (EL type: 20° C.)] of 1 or more and less than 20 mPa·s.

2. The water based ink composition for the ballpoint pen according to claim 1, containing approximately 0.05 to 1.0% of the ι-carrageenan in a total amount of the ink composition.

3. The water based ink composition for the ballpoint pen according to claim 1, wherein said naphthalene-based dye intermediate is one or two or more selected from those including an acid residue of naphthalenesulfonic acids (1) (including N-substituted products) represented by a following structural formula (A):

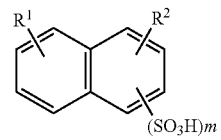

[Chemical 1]

wherein m denotes an integer of 1 to 3, and R$^1$ and R$^2$ respectively denote H, OH or NH2, and those including an acid residue of naphthalenecarboxylic acids (2) represented by a following structural formula (B):

(2)

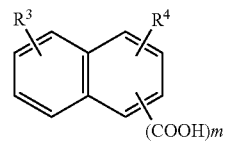

[Chemical 2]

wherein m denotes an integer of 1 to 4, and R$^3$ and R$^4$ respectively denote H, OH or NH2, and wherein in this regard, however, R' in the N-substituted product (NHR') denotes an alkyl (1 to 9 carbon atoms), alkylacyl (1 to 9 carbon atoms), benzoyl or benzensulfonyl.

4. The water based ink composition for the ballpoint pen according to claim 3, wherein the naphthalene-based dye intermediate is one or two or more selected from those including the acid residue of naphthalenesulfonic acids (including N-substituted products) represented by said structural formula (I).

5. The water based ink composition for the ballpoint pen according to claim 4, wherein the naphthalenesulfonic acids are aminonaphtholsulfonic acids.

6. The water based ink composition for the ballpoint pen according to claim 5, wherein the aminonaphtholsulfonic acids are selected from those including the acid residue of N-acyl J acids (2 to 4 acyl carbon atoms) represented by a following structural formula (3)

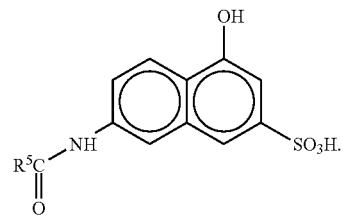

[Chemical 3]

7. The water based ink composition for the ballpoint pen according to claim 1, containing approximately 0.1 to 5% of the naphthalene-based intermediate in the total amount of the ink composition.

8. A refill for a ballpoint pen, filled with the water based ink composition for the ballpoint pen according to claim 1.

9. A retractable ballpoint pen, assembled so that a writing edge of the refill for the ballpoint pen according to claim 8 can be retracted and extruded from a front opening of a ballpoint pen barrel.

* * * * *